(12) United States Patent
Holmes et al.

(10) Patent No.: US 11,294,542 B2
(45) Date of Patent: *Apr. 5, 2022

(54) TECHNIQUES FOR CREATING AND PRESENTING MEDIA CONTENT

(71) Applicant: Descript, Inc., San Francisco, CA (US)

(72) Inventors: Ryan Terrill Holmes, Walnut Creek, CA (US); Steven Surmacz Rubin, San Francisco, CA (US); Ulf Schwekendiek, San Francisco, CA (US); David John Williams, San Francisco, CA (US)

(73) Assignee: Descript, Inc., San Francisco, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/736,156

(22) Filed: Jan. 7, 2020

(65) Prior Publication Data

US 2020/0142558 A1 May 7, 2020

Related U.S. Application Data

(63) Continuation of application No. 15/835,266, filed on Dec. 7, 2017, now Pat. No. 10,564,817.
(Continued)

(51) Int. Cl.
  *G06F 17/00* (2019.01)
  *G06F 3/0484* (2022.01)
  (Continued)

(52) U.S. Cl.
  CPC ........ *G06F 3/0484* (2013.01); *G06F 3/04817* (2013.01); *G06F 16/685* (2019.01);
  (Continued)

(58) Field of Classification Search
  CPC .... G06F 3/0484; G06F 16/685; G06F 16/686; G06F 3/04817; G10L 15/187; G10L 15/26; G10H 2220/126
  See application file for complete search history.

(56) References Cited

U.S. PATENT DOCUMENTS 5,682,326 A 10/1997 Klingler et al.
6,871,107 B1 3/2005 Townsend et al.
(Continued)

*Primary Examiner* — Mohammed H Zuberi
(74) *Attorney, Agent, or Firm* — Perkins Coie LLP; Brian Coleman; Andrew T. Pettit

(57) ABSTRACT

Different types of media experiences can be developed based on characteristics of the consumer. "Linear" experiences may require execution of a pre-built script, although the script could be dynamically modified by a media production platform. Linear experiences can include guided audio tours that are modified or updated based on the location of the consumer. "Enhanced" experiences include conventional media content that is supplemented with intelligent media content. For example, turn-by-turn directions could be supplemented with audio descriptions about the surrounding area. "Freeform" experiences, meanwhile, are those that can continually morph based on information gleaned from a consumer. For example, a radio station may modify what content is being presented based on the geographical metadata uploaded by a computing device associated with the consumer.

23 Claims, 8 Drawing Sheets

Related U.S. Application Data

(60) Provisional application No. 62/434,771, filed on Dec. 15, 2016.

(51) Int. Cl.
  *G10L 15/187* (2013.01)
  *G06F 3/04817* (2022.01)
  *G06F 16/68* (2019.01)
  *G10L 15/26* (2006.01)
  *G06F 16/683* (2019.01)

(52) U.S. Cl.
  CPC ......... *G06F 16/686* (2019.01); *G10L 15/187* (2013.01); *G10L 15/26* (2013.01); *G10H 2220/126* (2013.01)

(56) References Cited

U.S. PATENT DOCUMENTS

| | | |
|---|---|---|
| 8,306,816 B2 | 11/2012 | Goldberg |
| 8,504,369 B1 | 8/2013 | Chigier et al. |
| 9,066,049 B2 | 6/2015 | Scoggins, II et al. |
| 9,432,516 B1 | 8/2016 | Barbulescu et al. |
| 9,870,796 B2 | 1/2018 | Goldberg |
| 10,242,669 B1 * | 3/2019 | Sandler .................. G10L 25/48 |
| 2002/0095290 A1 | 7/2002 | Kahn et al. |
| 2002/0152076 A1 | 10/2002 | Kahn et al. |
| 2003/0004724 A1 | 1/2003 | Kahn et al. |
| 2005/0131559 A1 | 6/2005 | Kahn et al. |
| 2005/0183109 A1 | 8/2005 | Basson et al. |
| 2006/0072727 A1 | 4/2006 | Bantz et al. |
| 2006/0149558 A1 | 7/2006 | Kahn et al. |
| 2006/0167686 A1 | 7/2006 | Kahn |
| 2006/0190249 A1 | 8/2006 | Kahn et al. |
| 2007/0106508 A1 | 5/2007 | Kahn et al. |
| 2007/0244700 A1 | 10/2007 | Kahn et al. |
| 2007/0244702 A1 | 10/2007 | Kahn et al. |
| 2008/0177536 A1 | 7/2008 | Sherwani et al. |
| 2008/0255837 A1 | 10/2008 | Kahn et al. |
| 2009/0132660 A1 | 5/2009 | Wyatt |
| 2011/0013756 A1 | 1/2011 | Davies et al. |
| 2011/0069230 A1 | 3/2011 | Polumbus et al. |
| 2011/0239107 A1 | 9/2011 | Phillips et al. |
| 2011/0257972 A1 | 10/2011 | Agevik |
| 2013/0060572 A1 | 3/2013 | Garland et al. |
| 2013/0110565 A1 | 5/2013 | Means, Jr. et al. |
| 2013/0124984 A1 | 5/2013 | Kuspa |
| 2013/0204618 A1 | 8/2013 | Henry et al. |
| 2013/0322665 A1 | 12/2013 | Bennett et al. |
| 2014/0035920 A1 | 2/2014 | Duwenhorst |
| 2014/0328575 A1 | 11/2014 | Rodriguez et al. |
| 2015/0106091 A1 * | 4/2015 | Wetjen .................. H04M 3/568 704/235 |
| 2017/0004859 A1 | 1/2017 | Charumilind |
| 2017/0018184 A1 | 1/2017 | Northrup et al. |
| 2018/0053510 A1 * | 2/2018 | Kofman ................. G10L 15/187 |
| 2018/0270350 A1 * | 9/2018 | Engelke ............... H04M 1/2475 |
| 2018/0358052 A1 * | 12/2018 | Miller .................. G11B 27/036 |
| 2019/0156816 A1 | 5/2019 | Singh et al. |
| 2019/0268465 A1 * | 8/2019 | Broidy .................. G06F 16/638 |
| 2019/0312973 A1 * | 10/2019 | Engelke ............. H04M 1/72433 |
| 2020/0404097 A1 * | 12/2020 | Engelke ............... H04M 1/2475 |
| 2021/0165973 A1 * | 6/2021 | Kofman ................ G10L 15/22 |

* cited by examiner

TECHNIQUES FOR CREATING AND PRESENTING MEDIA CONTENT

CROSS-REFERENCE TO RELATED APPLICATIONS

This application is a continuation of U.S. patent application Ser. No. 15/835,266, titled "Techniques for Creating and Presenting Media Content" and filed on Dec. 7, 2017, which claims priority to U.S. Provisional Patent Application No. 62/434,771, titled "Techniques for Creating and Presenting Media Content" and filed on Dec. 15, 2016, both of which are incorporated by reference herein in their entirety.

FIELD OF THE INVENTION

At least one embodiment of the present disclosure pertains to tools for creating and presenting media content and, more particularly, to software programs for tailoring media content based on characteristics of the consumer.

BACKGROUND

A digital audio workstation (DAW) is an electronic device or a software program for recording and producing audio files, such as songs, speech, and sound effects. DAWs come in a wide variety of configurations, from a software program executing on a personal computer to a highly complex configuration of numerous components (e.g., recording devices, such as microphones, and editing devices, such as personal computers) controlled by a central computing device.

Conventionally, a DAW consists of a mixing console, control surface, audio converter, and data storage in a single computing device. These hardware-implemented DAWs were more popular before commonly available personal computers became powerful enough to run the necessary audio editing software.

Nowadays, "DAW" may simply refer to the audio editing software itself. The computing device responsible for executing the audio editing software typically includes either a sound card or audio interface, as well as at least one input device for modifying data. Examples of input devices include a mouse, a piano-style MIDI controller keyboard, an automated fader board for mixing track volumes, etc. The computing device acts as a host for the sound card/audio interface, and the software provides the interface and functionality for audio editing. While these computer-based DAWs have extensive recording, editing, and playback capabilities, they are often designed for use by audio experts.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
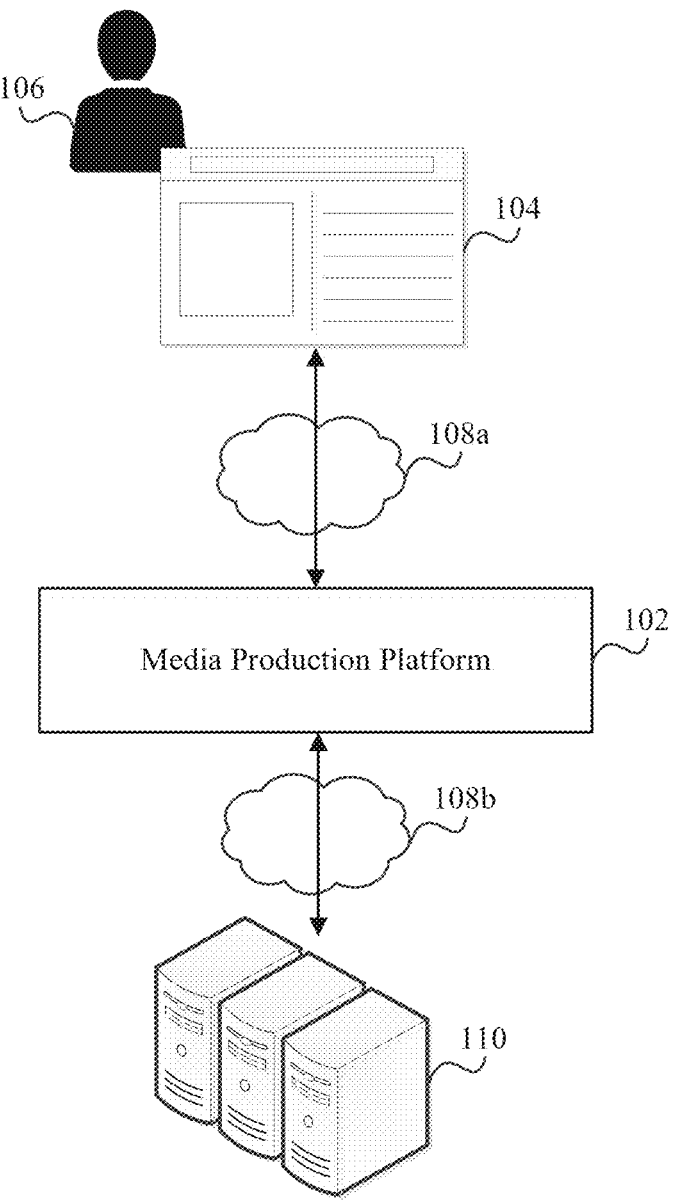
FIG. 1 illustrates a network environment that includes a media production platform responsible for creating graphical user interfaces (GUIs) through which developers can product (e.g., create and edit) media content.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Media content can be experienced in a variety of different ways, including via radio, television, podcasts, etc. Multiple forms of media content are often combined to form a multimedia experience. These different forms can include text-based media, audio-based media, video-based media, or any combination thereof. However, content-based experiences are normally static in nature. Because content-based experiences are conventionally fixed after the design has been finalized by a developer, a content-based experience does not change as it is being experienced by an end user (also referred to as a "consumer" of media content).

Introduced here are software-implemented tools for producing (e.g., creating and editing) and distributing media content. These tools can be used to simultaneously or sequentially edit text, audio, and/or video. Accordingly, the tools may be used by radio producers, podcast producers, television producers, etc.

More specifically, various embodiments pertain to software programs for producing media content, distributing media content, consuming media content, etc. A software program may be associated with a media production platform or a media distribution platform. For example, some software programs described herein are supported by a media production platform, while other software programs described herein are supported by a media distribution platform. Reference may be made to these platforms throughout the Detailed Description for the purpose of illustration. However, those skilled in the art will recognize that either platform could perform the described task, include the described feature, etc. Moreover, a single platform may be able to perform the tasks that are typically performed by the media production platform and the media distribution platform.

The software programs may reside on a computing device on which a consumer can consume the media content. The software programs described herein may be mobile applications, desktop applications, web browsers, or over-the-top (OTT) applications. For example, a developer could produce a content-based experience using a desktop application, while a consumer could participate in the content-based experience using a mobile application. Accordingly, the software programs used to produce/distribute media content may be distinct but related to one another.

Generally, the software program is designed for execution by a specific operating system, such as Microsoft Windows®, Apple macOS®, Apple iOS, Linux® (and its variants), Google Android®, etc. While certain embodiments may be described in the context of a certain type of software program, those skilled in the art will recognize that the features are equally applicable to other software program types.

Thus, a software program may be downloaded by an end user from a network-accessible environment (e.g., a digital distribution platform accessible via a website or application store). Moreover, the software program may be configured to automatically launch in response to determining the computing device has come within a specified proximity of a certain geographical location associated with a content-based experience. For example, a previously-purchases audio tour for the Tenderloin neighborhood of San Francisco, Calif., could be automatically downloaded by the computing device upon determining that the computing device has come within a specified proximity of the starting location or the Tenderloin neighborhood as a whole.

Different system architectures could be used to build the media production platform and the media distribution platform. These platforms may be executed by a cloud computing service operated by, for example, Amazon Web Services® (AWS), Google Cloud Platform™, Microsoft Azure®, or a similar technology. Moreover, each platform could reside on a dedicated instance of AWS, and different interfaces or projects may be supported by different containers using different Internet Protocol (IP) addresses for network access.

Often, a host computer server is responsible for supporting the media production platform and/or the media distribution platform. The host computer server may be communicatively coupled to one or more content computer servers that include media content and other assets. Note, however, that the platforms could also be designed so that they can function without a host computer server. For example, the media production platform and media distribution platform may be embodied as software programs that reside entirely on computing devices associated with a developer and consumer, respectively.

Terminology

References in the present disclosure to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and comprising" are to be construed in an inclusive sense rather than an exclusive or exhaustive sense (i.e., in the sense of "including but not limited to"). The terms "connected," "coupled," or any variant thereof is intended to include any connection or coupling, either direct or indirect, between two or more elements. The coupling/connection can be physical, logical, or a combination thereof. For example, two devices may be electrically and/or communicatively coupled to one another.

When used in reference to a list of multiple items, the word "or" is intended to cover all of the following interpretations: any of the items in the list, all of the items in the list, and any combination of items in the list. Meanwhile, if the present disclosure states that a feature "may," "can," "could," or "might" be included or have a characteristic, that particular feature is not required and need not necessarily have the characteristic.

The term "module" refers broadly to software, hardware, and/or firmware components. Modules are typically functional components that generate useful data and/or other output(s) based on specified input(s). A software program may include one or more modules, or a module may include one or more software programs.

System Topology Overview

FIG. 1 illustrates a network environment 100 that includes a media production platform 102 responsible for creating graphical user interfaces (GUIs) through which developers can product (e.g., create and edit) media content. Examples of media content include audio-based content (e.g., radio segments and podcasts) and video-based content (e.g., television programs and presentations). An end user 106 (also referred to as a "developer" of media content) can interface with the media production platform 102 via a network-accessible interface 104. The developer 106 may be, for example, an individual interested in recording media content, editing media content, etc.

The media production platform 102 may reside in a network environment 100. Thus, the media production platform 102 may be connected to one or more computer networks 108*a-b*, which may include personal area networks (PANs), local area networks (LANs), wide area networks (WANs), metropolitan area networks (MANs), cellular networks, the Internet, etc. Other wired communication channels or wireless communication channels could also be used. For example, the computing device on which the developer 106 accesses the network-accessible interface is communicatively coupled to a microphone, an instrument, a piano-style MIDI controller keyboard, an automated fader board for mixing track volumes, etc.

Figure 3:
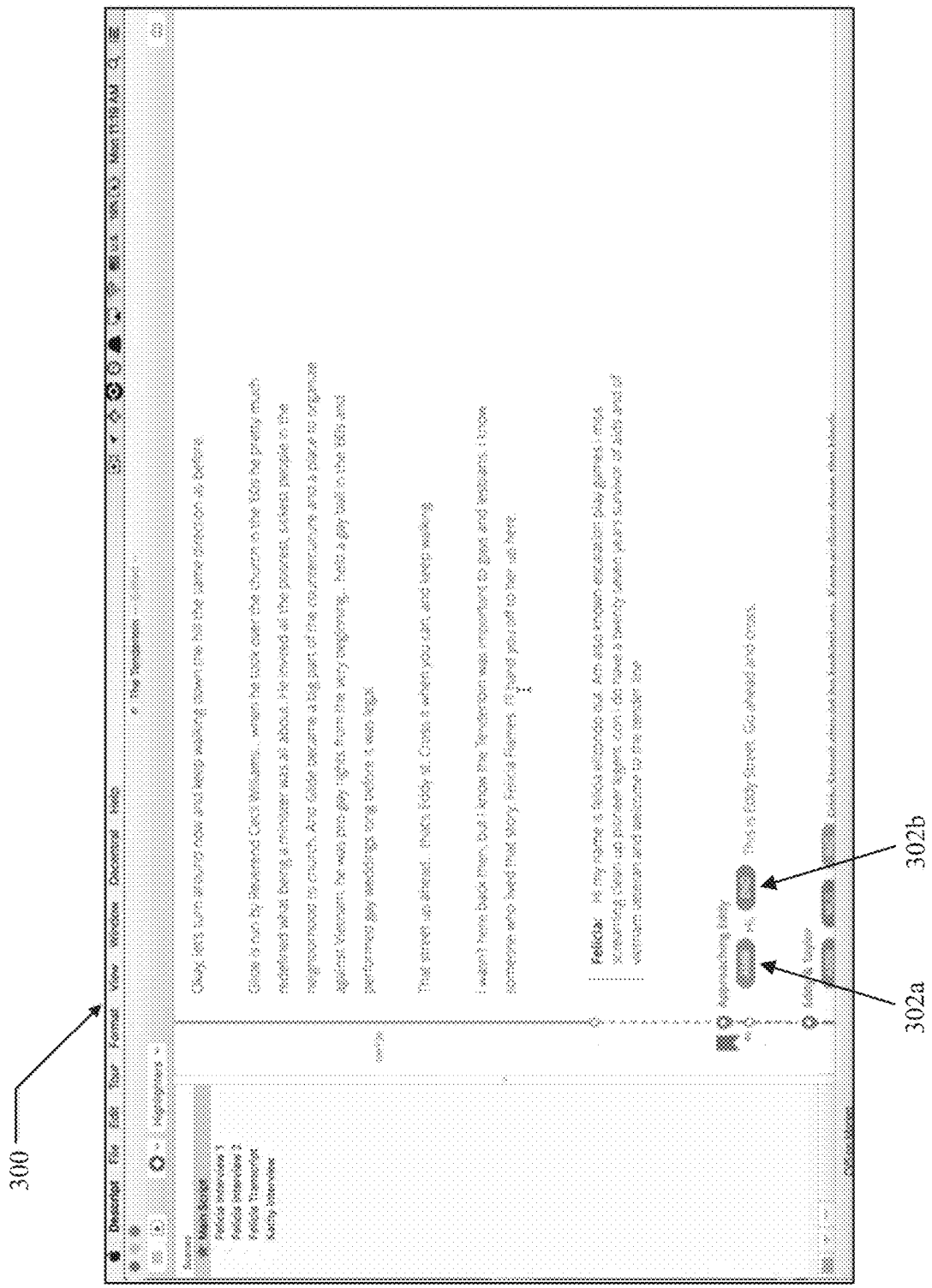
FIG. 3 depicts an interface that enables a developer to readily produce media content.

As further described below, the media production platform 102 can facilitate transcript-driven media production. The developer 106 may be able to alter an audio file by modifying a corresponding transcript posted to the network-accessible interface 104. For example, the developer 106 could insert audio files (e.g., music clips and sound effects) directly within the transcript, as shown in FIG. 3.

The media production platform 102 may also be able to automatically modify media content on behalf of the developer 106. In fact, the media production platform 102 could create/modify a timeline associated with a content-based experience (e.g., an audio tour, audiobook, video segment, or video game) based on the implicit actions and/or explicit actions of the individual participating in the experience (also referred to as a "consumer" of the media content). For example, the media production platform 102 may intelligently add, remove, and/or modify media content within a guided audio tour as the individual progresses through the guided audio tour.

Media content could reside on the computing device used to access the network-accessible interface 104, on a content server 110 accessible to the media production platform 102, etc. Thus, media content could be hosted locally and/or remotely.

The network-accessible interface 104 may enable multiple developers to simultaneously or sequentially edit the same media content. For example, when multiple developers simultaneously access the network-accessible interface 104, the media production platform 102 may ensure that changes made by a given developer are posted to each instance of the network-accessible interface 104 in near real time. While certain embodiments are described in the context of network-accessible interfaces, those skilled in the art will recognize that the interfaces need not necessarily be accessible via a network. For example, a computing device associated with the developer 106 may be configured to execute a self-contained software program (e.g., a desktop software program) that does not require network access. Instead, the self-contained software program may cause all necessary assets (e.g., instruction sets and media content) to be downloaded at a single point in time or on a periodic basis (e.g., daily or weekly).

Additional features of the media production platform 102 are described in U.S. patent application Ser. No. 15/761,957, which is incorporated by reference herein in its entirety.

Figure 2:
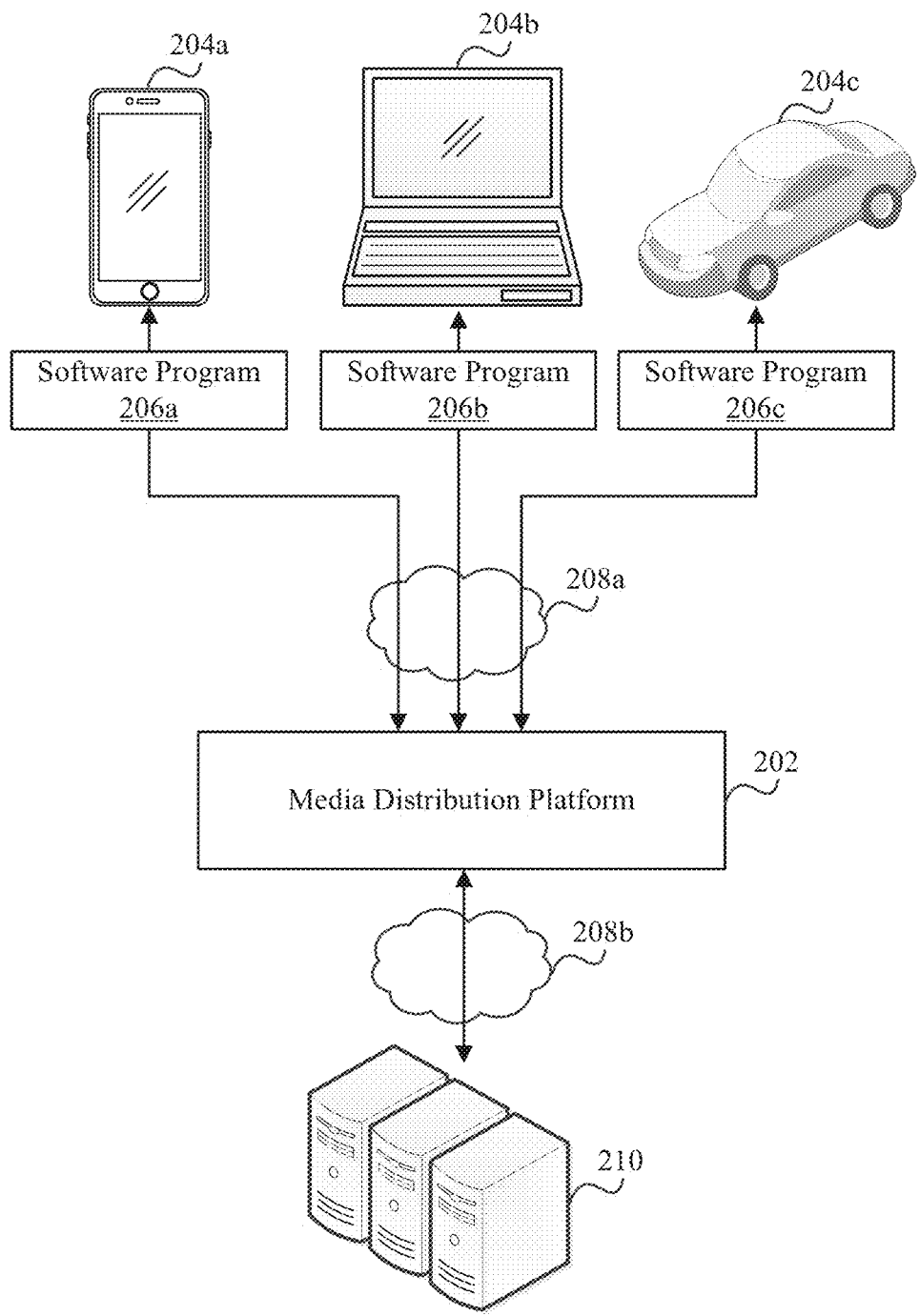
FIG. 2 illustrates a network environment that includes a media distribution platform responsible for distributing media content to one or more presentation mediums.

FIG. 2 illustrates a network environment 200 that includes a media distribution platform 202 responsible for distributing media content to one or more presentation mediums 204a-c. A presentation medium could be any network-accessible electronic device, such as a desktop computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality system (e.g., a head-mounted display such as the Oculus Rift® or the Microsoft Hololens®), or radio (e.g., a standalone radio and those included in, for example, vehicles).

In some embodiments, the media distribution platform 202 is communicatively coupled to a software program 206a-c designed to be executed by the corresponding presentation medium 204a-c. The software program 206a-c may permit consumers to download and/or consume media content. The media distribution platform 202 may be connected to the software programs 206a-c via one or more computer networks 208a-b, which may include PANs, LANs, WANs, MANs, cellular networks, and the Internet. Other wired communication channels or wireless communication channels could also be used.

After a consumer initiates a software program on a presentation medium, the consumer can download, play, modify, etc., media content. For example, the consumer may download a content-based experience for a certain geographical area, such as a guided audio tour. The media distribution platform 202 can support the software program by providing the media content to the presentation medium. Here, for example, the media distribution platform 202 may transmit media content to software program 206a executing on presentation medium 204a, software program 206b executing on presentation medium 204b, and/or software program 206c executing on presentation medium 204c. These presentation mediums 204a-c could also be communicatively coupled to one another. For example, the media distribution platform 202 may transmit media content to software program 206a executing on presentation medium 204a, which causes at least some of the media content to be presented by audio output mechanism(s) and/or video output mechanism(s) included in presentation medium 204b or presentation medium 204c.

The media content could be transmitted to the presentation medium upon being purchased, determining that the presentation medium has come within a specified proximity of a certain geographical location, etc. The media content could be hosted by the media distribution platform 202, one or more content computer servers 210, or both. The media distribution platform 202 may also be responsible for creating and supporting various interfaces that are accessible via a web browser, desktop application, mobile application, OTT application, or any combination thereof.

Media production platform 102 of FIG. 1 and media distribution platform 202 of FIG. 2 may be executed by a cloud computing service operated by, for example, Amazon Web Services® (AWS), Google Cloud Platform™ Microsoft Azure®, or a similar technology. Moreover, each platform could reside on a dedicated instance of AWS, and different interfaces or projects may be supported by different containers using different Internet Protocol (IP) addresses for network access. Thus, these platforms could reside on a single piece of hardware (e.g., a computer server).

Often, a host computer server is responsible for supporting the media production platform and/or the media distribution platform. The host computer server may be communicatively coupled to one or more content computer servers that include media content and other assets. Note, however, that the platforms could also be designed so that they can function without a host computer server.

FIG. 3 depicts an interface 300 that enables a developer to readily produce media content. The interface 300, which could be created by a media production platform, may enable nearly anyone who knows how to use a word processor to produce media content.

The media production platform can support powerful features that can be used to create media content, incorporate consumer feedback, and ensure the interface 300 is straightforward and easy to use. Examples of media content include podcasts, audiobooks, radio/television segments, and location-based audio/video experiences such as guided tours and lessons. These powerful features are enabled by higher level content-based editing tools, rather than the lower level waveform-based editing tools used by conventional digital audio workstations (DAWs). In fact, the media production platform can facilitate collaboration between multiple developers simultaneously (as well as multiple consumers who consume content simultaneously).

The interface 300 may facilitate in-line editing of a transcript associated with media content. Audio files can be selected and placed (e.g., via a drag-and-drop mechanism) directly where the developer would like the audio file to play. In FIG. 3 several music files have been placed within the transcript by the developer, while in FIG. 5 a music file 504 and a sound effect file 506 have been placed within the transcript by the developer. Similarly, effects (e.g., pauses) can be placed directly where the developer would like the effect to begin or end. This may be effected by visual elements 302a-b (also referred to as "pills") that the developer is able to easily select and move within the window. For example, the developer may insert a first pill 302a that represents when an audio file should begin playing and a second pill 302b that represents when the audio file should cease playing.

Visual markers may also be used to relay such information. For example, a vertical dashed line may be used to represent segments where no media content exists within the compilation. These segments (also referred to as "gaps" in the content-based experience) may be visually highlighted so that the segments can be filled in by the developer. As another example, a vertical dotted line may be used to represent segments where a media file overlaps with another media file in such a manner that would make at least one media file difficult to consume. As yet another example, a vertical solid line may be used to represent finalized segments that are ready for consumption by consumers. As media content is added to the compilation, the media production platform can automatically modify the visual markers based on developer input (e.g., by increasing/decreasing the length of a vertical line).

The media production platform could also automatically decompose a compilation of media content into smaller chunks. For example, a guided audio tour, radio segment, or podcast could be broken into 20 second segments to provide greater flexibility in modifying the underlying media file(s). These smaller segments may enable the media production platform to dynamically adapt media content as the developer produces a compilation of media content. These smaller segments may also enable the media distribution platform to dynamically adapt media content as a consumer consumes the compilation of media content. The media production platform or the media distribution platform may be able to predictively make changes to the compilation of media content based on consumer characteristics. For example, segment(s) could be removed if the consumer's pace quickens or segment(s) could be added if the consumer's pace slows.

Some of these changes may be effected by conditions or transitions that are based on consumer feedback, external data (e.g., sensor data from a computing device associated with the consumer), ambient conditions, etc. For example, when multiple consumers are simultaneously participating in a content-based experience, the media distribution platform may dynamically modify the experience for some or all of those consumers (e.g., by forcing some of the consumers to follow an alternative path). As noted above, these changes may be enabled by each consumer's computing device uploading data to the media distribution platform.

In some embodiments, the interface(s) created by the media production platform may enable developers to integrate vendors into a content-based experience. For example, a developer may specify that a consumer should buy a sandwich, purchase a ticket to an exhibit, or reserve studio time as part of a guided audio tour or podcast. As another example, a developer may cause advertisements for vendors relevant to media content being consumed to be presented to a consumer. A vendor may be relevant to media content if the vendor is associated with similar subject matter (e.g., a restaurant for a food-related podcast), located within a specified proximity (e.g., located near the site of a guided audio tour), etc. Transactions such as these could be completed by the consumer through a software program executing on the computing device that is also used to experience the media content. For example, a purchase of a foodstuff from a restaurant that is visited on a guided audio tour may be facilitated by a mobile application executing on a mobile phone operated by the consumer rather than via cash, payment card, etc.

Figure 4:
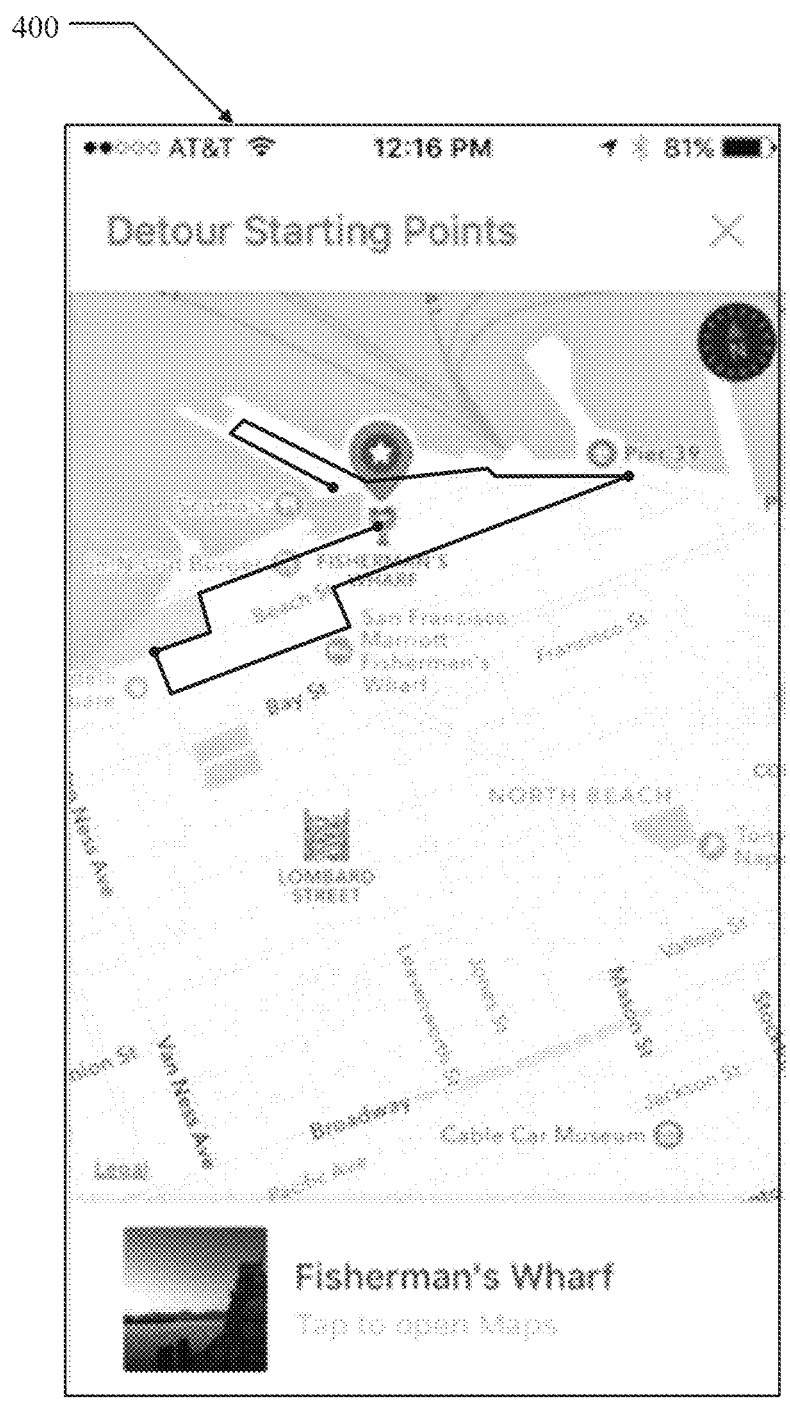
FIG. 4 depicts an interface that enables a developer to readily create location-based experiences involving one or more types of media content.

FIG. 4 depicts an interface 400 that enables a developer to readily create location-based experiences involving one or more types of media content. Here, for example, the developer may be able to create a route that consumers are expected to traverse during a location-based experience by specifying multiple geographical markers. A media development platform could propose route(s) between the specified geographical markers based on, for example, those route(s) recommended by a mapping service such as Google Maps™.

Some interfaces presented herein may enable the developer to create location-based experiences that involve indoor or outdoor activities in which consumers use navigational techniques to consume the media content. For example, the interfaces could be used to create guided audio tours, video segments, or podcasts that include elements of geocaching, where the developer intends the consumer to hide and seek containers or "caches" in the real world. Similar techniques could also be used to develop dating experiences, campus/corporate tours, lessons/trainings, etc. For example, when used to create a content-based dating experience, the developer may insert one or more activities that provide an opportunity to indicate a willingness to continue/discontinue the data.

Location-based experiences may require the consumer be indoors or outdoors at different points in time. Computing devices associated with consumers (e.g., fitness trackers, mobile phones, or tablet computers) may be used to establish an accurate geographical position when outdoors. For example, a computing device may upload GPS metadata that includes GPS coordinate(s) to the media distribution platform. However, location modeling techniques often play a larger role when the consumer is indoors because location resolution is typically worse indoors (e.g., GPS coordinates may be unreliable or inaccurate). Thus, the developer may provide more specific instructions when the consumer is expected to be indoors ("Please walk through the next two rooms and then take a left turn into the gallery.").

Figure 5:
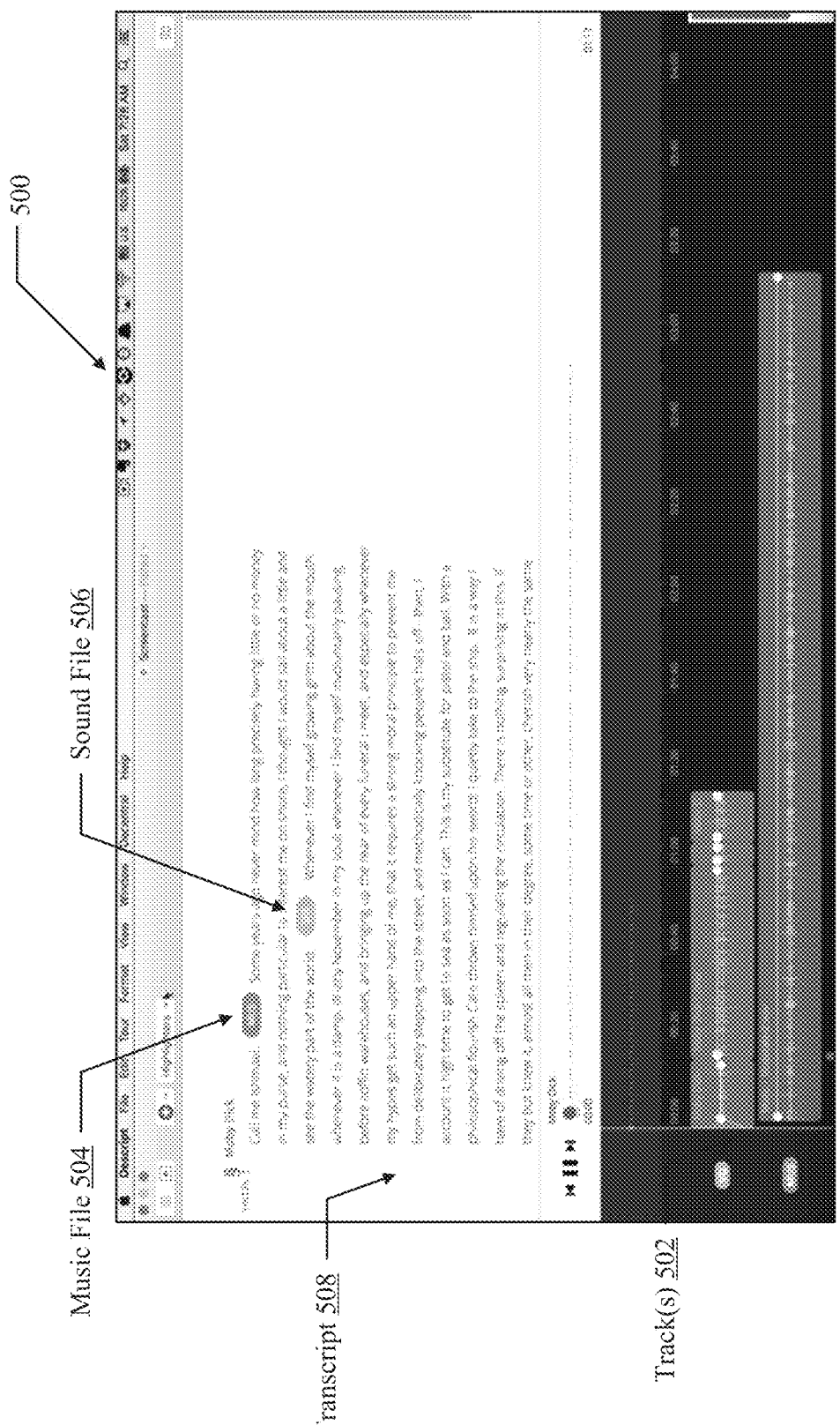
FIG. 5 depicts an interface that allows different types of media content to be intelligently mixed by the media production platform and/or the media distribution platform.

FIG. 5 depicts an interface 500 that allows different types of media content to be intelligently mixed by the media production platform and/or the media distribution platform. Once an audio file has been placed within the transcript 508, a waveform corresponding to the audio file may be automatically placed along one of the track(s) 502 in a waveform window. When the audio file is moved by the developer within the transcript 508, the media production platform can ensure that the corresponding waveform moves along the track as well. The transcript 508 and the audio file(s) arranged along the track(s) 502 are typically synced to one another so that changes made to one can be propagated across the other by the media production platform in near real time. Although the interfaces of FIGS. 3 and 5 include pills representing audio files, other types of media content (e.g., video, still images, text passages, virtual or augmented reality features) could be treated similarly by the media production platform. Thus, compilations of different forms of media content could be seamlessly created by inserting graphical symbols directly into the transcript 508.

In some embodiments, the media production platform applies one or more algorithms that allow media content compilations to be dynamically modified. For example, the media production platform may estimate the amount of time it will take to play an audio file or the amount of time it will take a consumer to reach a particular geographical location (e.g., based on the average walking speed and total distance expected to be traveled). These values may be posted to the interface 500 for review by the developer, who may use the values to avoid designing disjointed content-based experiences.

In some embodiments, media content can be intelligently interjected into other media content by the media production platform and/or the media distribution platform. For example, one audio segment (e.g., verbal instructions) could be interjected within another audio segment (e.g., a radio feed). Unlike conventional techniques, the media can be interjected into natural dividing points that are determined by analyzing the media content to be modified. Natural dividing points could be manually specified by the developer or automatically determined by parsing the media to be modified (e.g., to identify commas, semicolons, periods, natural pauses, etc.). Accordingly, natural dividing points could be marked (e.g., manually by the developer or automatically by the media production platform) when media content is initially created, added to the media content post hoc, or intelligently determined by the media production platform or media distribution platform in real time as the media content is being presented. Interjecting the media content into such dividing points eliminates or reduces the number of abrupt breaks and missed content.

Similar techniques could also be used to produce enhanced podcasts, video clips, etc. For instance, a consumer could specify that they only have time for a 15 minute version of a 60 minute podcast, and the media production platform or the media distribution platform could intelligently construct a modified version by piecing together the most important segments. The importance of these segments could be specified by the developer during development. Moreover, the media production platform or the media distribution platform may intelligently determine which segments can be spliced together based on, for example, words recognized within the segments following the application of a speech recognition algorithm.

Different types of media experiences can be developed based on characteristics of the consumer. "Linear" experiences may require execution of a pre-built script, although the script could be dynamically modified by a media production platform prior to consumption or by a media distribution platform during consumption. Linear experiences, such as guided audio tours and podcasts, can be modified or updated based on the location of the consumer. For example, when a consumer specifies an intended route (e.g., a driving route from San Francisco to Los Angeles), content associated with the intended route can be created.

"Enhanced" experiences include conventional media content that is supplemented with intelligent media content. For example, turn-by-turn directions could be supplemented with audio descriptions about the surrounding area (e.g., local history or upcoming events).

"Freeform" experiences, meanwhile, are those that can continually morph based on information gleaned from the consumer. Such information may be derived from metadata uploaded to the media production platform by a computing device associated with the consumer. For example, a radio station may modify the media content that is being presented based on the consumer's geographical location. In such embodiments, different clips of media content can be intelligently pieced together to create a dynamic feed that is contextual to wherever the consumer is at a given point in time.

Some or all of these experiences may optionally incorporate certain content that is reusable across different experiences. For example, audio descriptions of current events could be interjected between audio descriptions of nearby geographical points of interest.

Figure 6:
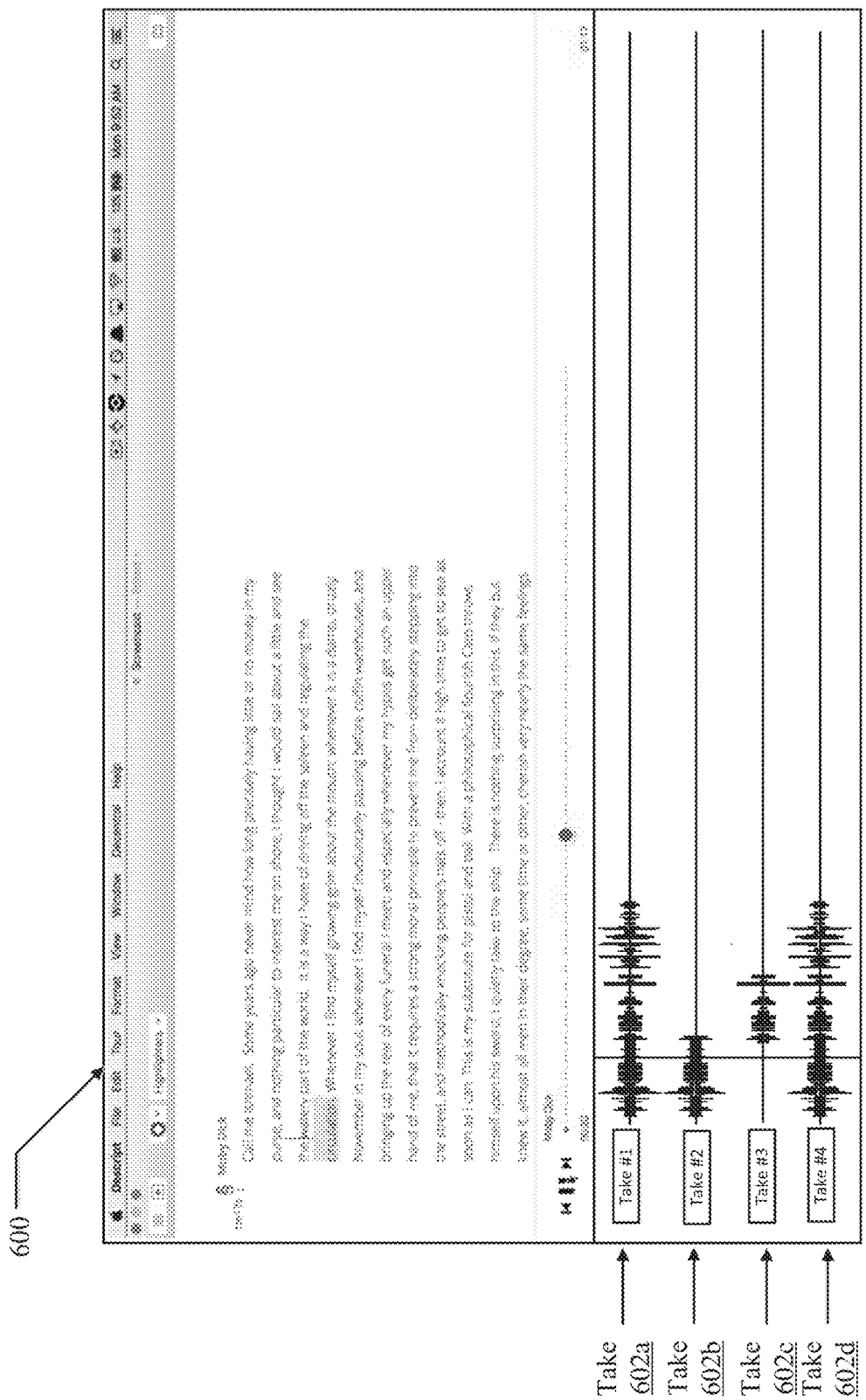
FIG. 6 depicts an interface that allows audio takes to be recorded and aligned with other media content (e.g., a transcript).

FIG. 6 depicts an interface 600 that allows audio takes 602a-d to be recorded and aligned with other media content (e.g., a transcript). When an audio file is received by the media production platform, the media production platform can analyze the audio file (e.g., by performing speech recognition) to determine its contents. For example, the media production platform may apply speech recognition algorithm(s) on a word level or phoneme level to discover words uttered by a speaker. The audio file could be uploaded to the media production platform (e.g., from a local or cloud-based storage) or recorded directly from the interface shown here.

When speech recognition is performed on the word level or phoneme level, the media production platform may be able to automatically align each audio file with other media content. The media production platform can align audio recordings with different segments of a transcript to allow for easier editing. Here, for example, words are visually highlighted in the transcript when spoken, while a vertical bar depicts progression along a common timeline. Moreover, multiple audio files may be aligned in such a way that the developer can readily determine which segments still need to be recorded. The media production platform could also visually highlight such segments. For example, the media production platform could mark those word(s) in a different color, emphasize those word(s) (e.g., by italicizing, underlining, or bolding), etc.

The interface 600 shown here can also assist in tape or recording management. For example, the interface may allow a developer to upload or record multiple audio takes 602a-d for a single source transcript. After processing each of the multiple audio takes 602a-d, the media production platform can automatically stack and align the audio takes 602a-d. These management techniques enable media content to be kept in a single location and allow the developer to easily piece together a final compilation from the media content. The media production platform may also automatically filter certain content from an audio take. For example, if the media production platform detects that the speaker has uttered a word that is not in the transcript, the media production platform may delete/mark the portion of the audio file corresponding to the word. As another example, if the media production platform detects multiple instances of a single sentence in an audio file, then the media production platform may break the audio file into multiple portions so that each instance corresponds to a single portion (i.e., an individually manipulable audio file).

In some embodiments, the media production platform can recommend or automatically compile portions of each of the multiple audio takes. For example, the media production platform may determine that one of the audio takes includes audible "junk" that should not make it into the final compilation. Audible "junk" could include misspoken words, background noises, and words not within the script (e.g., ad libs or exclamations).

The responsibility of producing the final compilation may also be distributed across multiple individuals or multiple computing devices. For example, the developer may manually record the multiple audio takes 602a-d that are to be posted to the interface 600, and then transmit the audio takes to the media production platform or save the audio takes 602a-d to a network-accessible storage medium. A finalized compilation could then be created by the media production platform or some other developer, and then transmitted back to the original developer for review.

Figure 7:
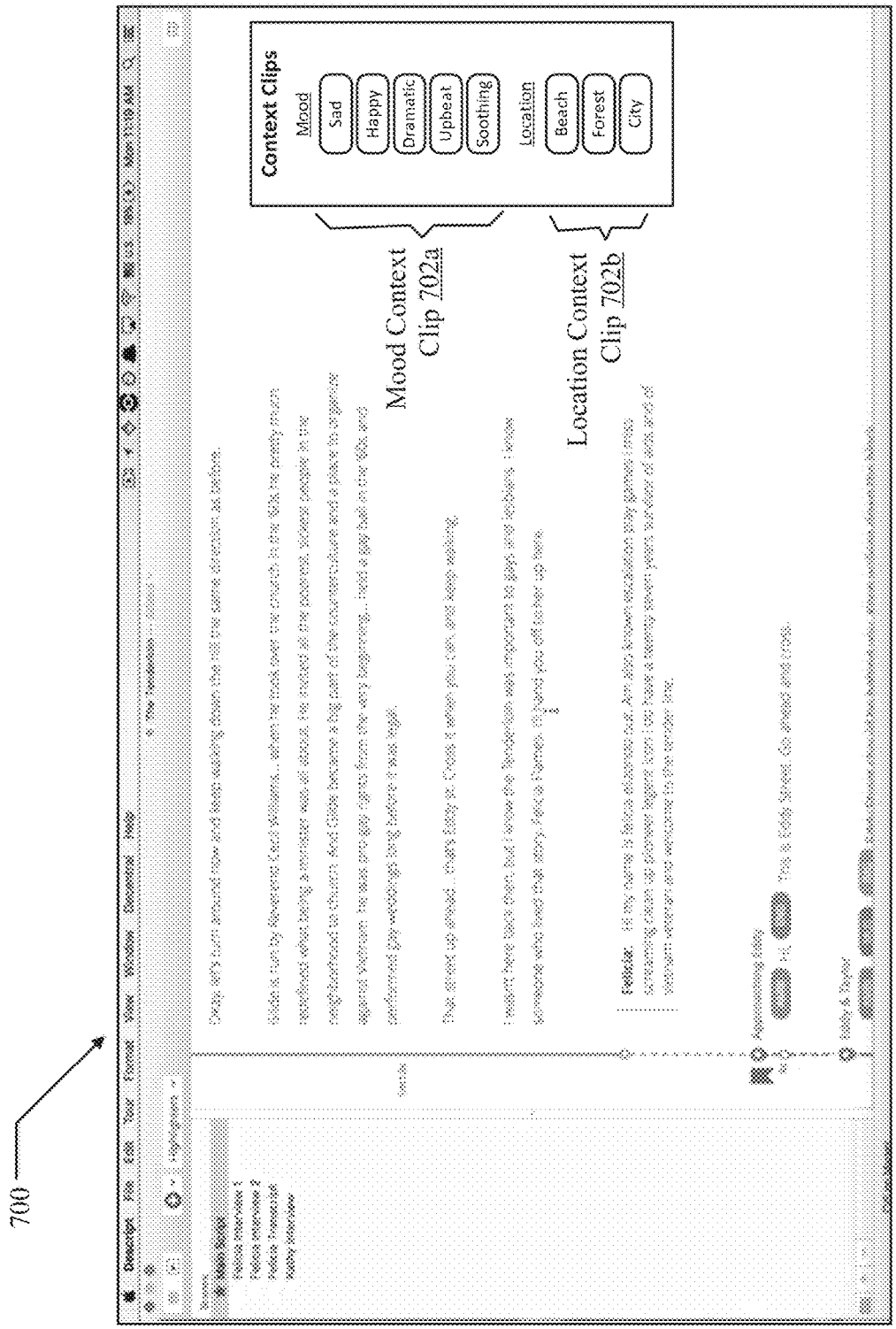
FIG. 7 depicts an interface that includes a series of context clips (also referred to as "audio emojis") that can be placed directly within a transcript.

FIG. 7 depicts an interface that inc700 ludes a series of context clips 702a-b (also referred to as "audio emojis") that can be placed directly within a transcript. These context clips 702a-b may or may not directly correspond to certain underlying media content. For example, in some embodiments the "sad" context clip includes a set compilation of media that was previously designed and created (e.g., by a developer or the media production platform). However, in other embodiments the "sad" context clip is dynamically created based on where it is inserted within the transcript. Said another way, characteristics such as the length of the context clip and the type(s) of media content used to create the context clip could vary based on where the context clip is inserted. Context may be determined by identifying the word(s) adjacent to the insertion point, the speaker(s) of those word(s), other media content inserted within a specified proximity of the insertion point, etc.

A developer may be able to select from numerous types of context clips. Here, for example, a variety of context clips 702a-b exist based on mood 702a and location 702b. The context clips 702a-b can (and often do) include a mix of different media clips. For instance, the "happy" context clip may include periodic laughing interspersed throughout one or more upbeat or uplifting music tracks. As another example, the "city" context clip could include car horn honks, semi-audible conversations, etc. In some embodiments, the context clips are personalized to the geographic area or experience being designed by the developer. For example, when the "city" context clip is inserted within a transcript of a walking tour of Fisherman's Wharf in San Francisco, an audio recording that includes sea lion barks or trolley bells may be injected into the underlying compilation.

These context clips 702a-b could also be automatically modified based on where a consumer experiencing the media compilation is at a given point in time. For example, the audio recording of sea lion barks or trolley bells could be played whenever the consumer enters a certain proximity of Fisherman's Wharf.

Processing System

Figure 8:
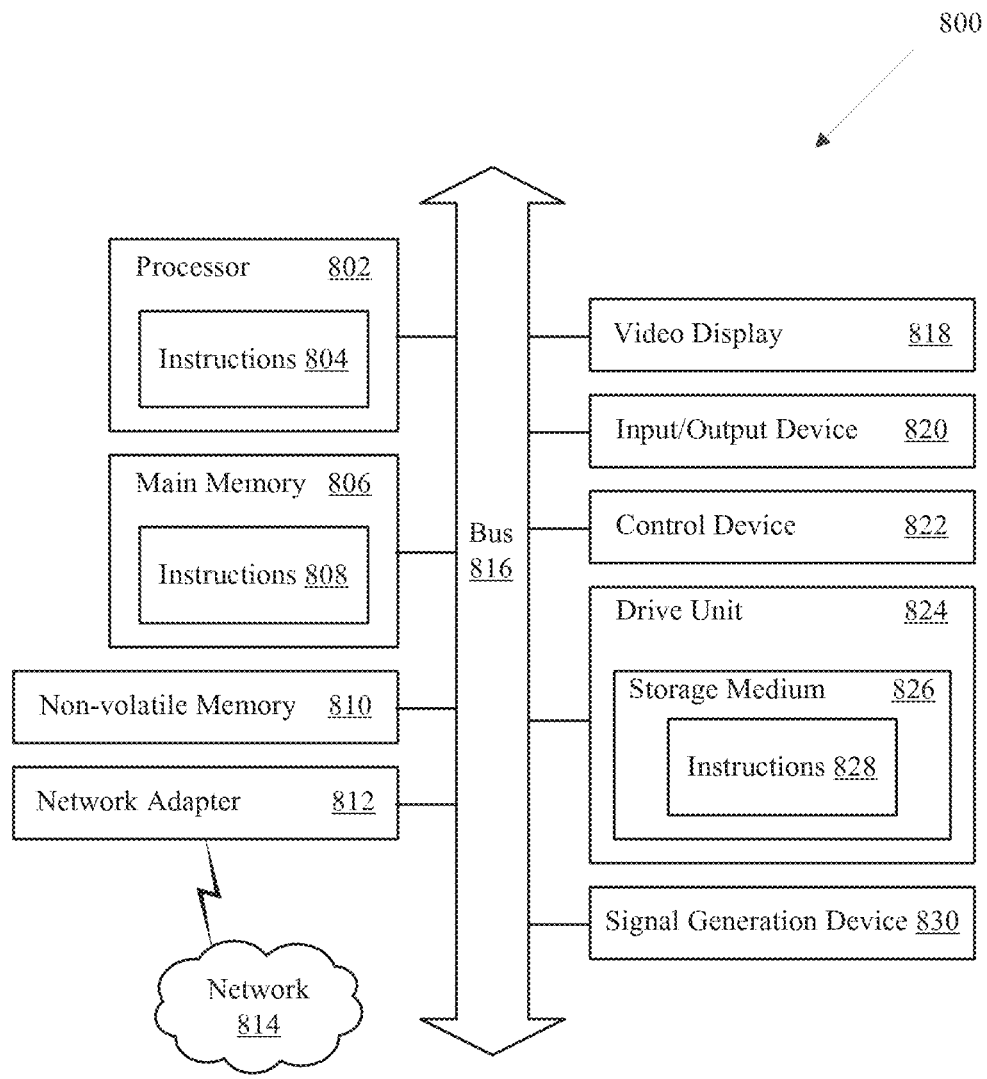
FIG. 8 is a block diagram illustrating an example of a processing system in which at least some operations described herein can be implemented.

FIG. 8 is a block diagram illustrating an example of a processing system 800 in which at least some operations described herein can be implemented. For example, some components of the processing system 800 may be hosted on a computing device that includes a media production platform (e.g., media production platform 102 of FIG. 1) or a media distribution platform (e.g., media distribution platform 202 of FIG. 2).

The processing system 800 may include one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 800 may share a similar computer processor architecture as that of a desktop computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness tracker), network-connected ("smart") device (e.g., a television or home assistant device), virtual/augmented reality systems (e.g., a head-mounted display such as Oculus Rift® or Microsoft Hololens®), or another electronic device capable of executing a set of instructions (sequential or otherwise) that specify action(s) to be taken by the processing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828.

The term "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 812 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
   posting a transcript in a first section of an interface that is accessible to an electronic device;
   obtaining multiple audio files that represent multiple recordings of dialogue included in the transcript;
   processing each audio file of the multiple audio files to identify words uttered by a corresponding speaker;
   identifying a segment of the transcript that has not been recorded based on an analysis of the identified words; and
   causing the segment of the transcript to be made visually distinguishable from other segments of the transcript that have been recorded.

2. The computer-implemented method of claim 1, wherein said causing comprises:
   placing a digital feature in first section of the interface proximate to the segment of the transcript.

3. The computer-implemented method of claim 1, further comprising:
   placing each audio file of the multiple audio files on a separate track in a second section of the interface,
      wherein the multiple audio files are represented as waveforms that are temporally aligned with one another along a common timeline.

4. The computer-implemented method of claim 3, further comprising:
   receiving input indicative of a selection of at least a portion of a given audio file of the multiple audio files;
   extracting the at least a portion of the given audio file; and
   creating a compilation by combining the at least a portion of the given audio file with another media file.

5. The computer-implemented method of claim 1, further comprising:
   acquiring a composite audio file that includes the multiple recordings of dialogue included in the transcript;
   parsing the composite audio file to identify each recording of the multiple recordings; and
   separating the composite audio file into the multiple audio files.

6. The computer-implemented method of claim 1, further comprising:
   receiving input indicative of a modification to the transcript; and
   effecting the modification by altering at least one audio file of the multiple audio files.

7. An electronic device comprising:
   a memory that includes instructions for producing media-based experiences,
   wherein the instructions, when executed by a processor, cause the processor to:
      acquire a first media file to be used in the production of a media-based experience;
      create a transcript for the first media file by applying an algorithm that converts recognized utterances into text;
      link the transcript to the first media file;
      post the transcript to an interface for review by a developer; and
      determine that at least one graphical symbol has been inserted into the transcript,
         wherein each graphical symbol is representative of an instruction regarding media to be included in the media-based experience.

8. The electronic device of claim 7, wherein the instructions further cause the processor to:
   alter the media based on a change indicated by a placement of the at least one graphical symbol in the transcript.

9. The electronic device of claim 7,
   wherein the at least one graphical symbol includes a first graphical symbol and a second graphical symbol, and
   wherein the instructions further cause the processor to:
      generate a first instruction that causes a second media file to initiate playback at a location of the first graphical symbol; and
      generate a second instruction that causes the second media file to cease playback at a location of the second graphical symbol.

10. The electronic device of claim 7, wherein each graphical symbol is associated with a media file that is dynamically generated based on context of an insertion point within the transcript.

11. The electronic device of claim 10, wherein the context is determined based on words adjacent to the insertion point, a speaker responsible for uttering the words, other media files inserted within a specified proximity of the insertion point, or any combination thereof.

12. The electronic device of claim 7, wherein each graphical symbol is associated with a mood, a location, or an action.

13. The electronic device of claim 7, wherein the instructions further cause the processor to:
   creating a media compilation that is indicative of the media-based experience by combining the first media file with the media represented by the at least one graphical symbol.

14. A non-transitory computer-readable medium with instructions stored thereon that, when executed, cause a processor to perform operations comprising:
- posting a transcript to an interface that is accessible via a software program executing on an electronic device, wherein the transcript is linked to media to be used in the production of a media-based experience;
- determining that multiple graphical symbols have been inserted into the transcript,
  - wherein each graphical symbol is representative of an instruction regarding the media; and
- modifying the media based on a characteristic of each graphical symbol of the multiple graphical symbols.

15. The non-transitory computer-readable medium of claim 14, wherein the operations further comprise:
- obtaining the media to be used in the production of the media-based experience; and
- linking the transcript to the media.

16. The non-transitory computer-readable medium of claim 15, wherein said linking is performed on a word level or a phoneme level.

17. The non-transitory computer-readable medium of claim 15,
- wherein the media includes audio content, and
- wherein the operations further comprise:
  - generating the transcript by applying an algorithm that converts recognized utterances into text to the audio content.

18. The non-transitory computer-readable medium of claim 14, wherein the characteristic is a location or a type of the corresponding graphical symbol.

19. A computer-implemented method comprising:
- posting a transcript in a first section of an interface that is accessible via a software program;
- obtaining multiple audio files that represent recordings of dialogue included in the transcript;
- processing each audio file of the multiple audio files to identify words uttered by a corresponding speaker; and
- placing each audio file of the multiple audio files on a separate track in a second section of the interface,
  - wherein the multiple audio files are represented as waveforms that are temporally aligned with one another along a common timeline such that segments, if any, of the transcript that have not been recorded are visually identifiable.

20. The computer-implemented method of claim 19, wherein the software program is a web browser.

21. The computer-implemented method of claim 19, further comprising:
- causing the segments to be made visually distinguishable from other segments of the transcript that have been recorded.

22. The computer-implemented method of claim 21, wherein said causing comprises:
- placing a digital feature in the first section of the interface proximate to each segment of the transcript that has not been recorded.

23. The computer-implemented method of claim 22, wherein the digital feature is a vertical line located alongside the transcript.

\* \* \* \* \*